United States Patent [19]

Murnane

[11] 4,032,081

[45] June 28, 1977

[54] LOCKING DEVICE FOR SAFETY BELT

[76] Inventor: Thomas Joseph Murnane, 2, Maymount, Friar's Walk, Cork, County Cork, Ireland

[22] Filed: June 16, 1976

[21] Appl. No.: 696,807

[30] Foreign Application Priority Data

June 16, 1975 Ireland .............................. 1351/75

[52] U.S. Cl. ........................ 242/107.4 B; 188/134; 188/180
[51] Int. Cl.² .................. A62B 35/02; B75H 75/48
[58] Field of Search ............ 242/107.4 R, 107.4 E; 188/134, 135, 180; 254/157, 159, 186; 297/388; 280/744–747

[56] References Cited

UNITED STATES PATENTS

| 3,016,113 | 1/1962 | Easley ........................... 254/157 X |
| 3,206,137 | 9/1965 | Snyderman ................. 242/107.4 B |
| 3,503,571 | 3/1970 | Martin .................... 242/107.4 B X |
| 3,918,658 | 11/1975 | Beller ......................... 242/107.4 B |

Primary Examiner—Stanley N. Gilreath
Assistant Examiner—John M. Jillions
Attorney, Agent, or Firm—Diller, Brown, Ramik & Wight

[57] ABSTRACT

A locking device is provided for a self-coiling vehicle safety belt having a mounted coil spindle attachable to the vehicle, wherein a spindle gear keyed to the coil spindle can transmit the torque of accelerated belt withdrawal to a partially toothless planetary gear (or a pair of such) thus overcoming an anti-rotation bias, rotating said planetary gear or gears into mesh (beyond the toothless segment) with a fixed gear so that orbital and rotary motion of the planetary gear or gears continues until a stop surface provided on each planetary gear abuts with a fixed stop surface thereby locking the entire mechanism against further rotation in the direction of belt withdrawal.

7 Claims, 4 Drawing Figures

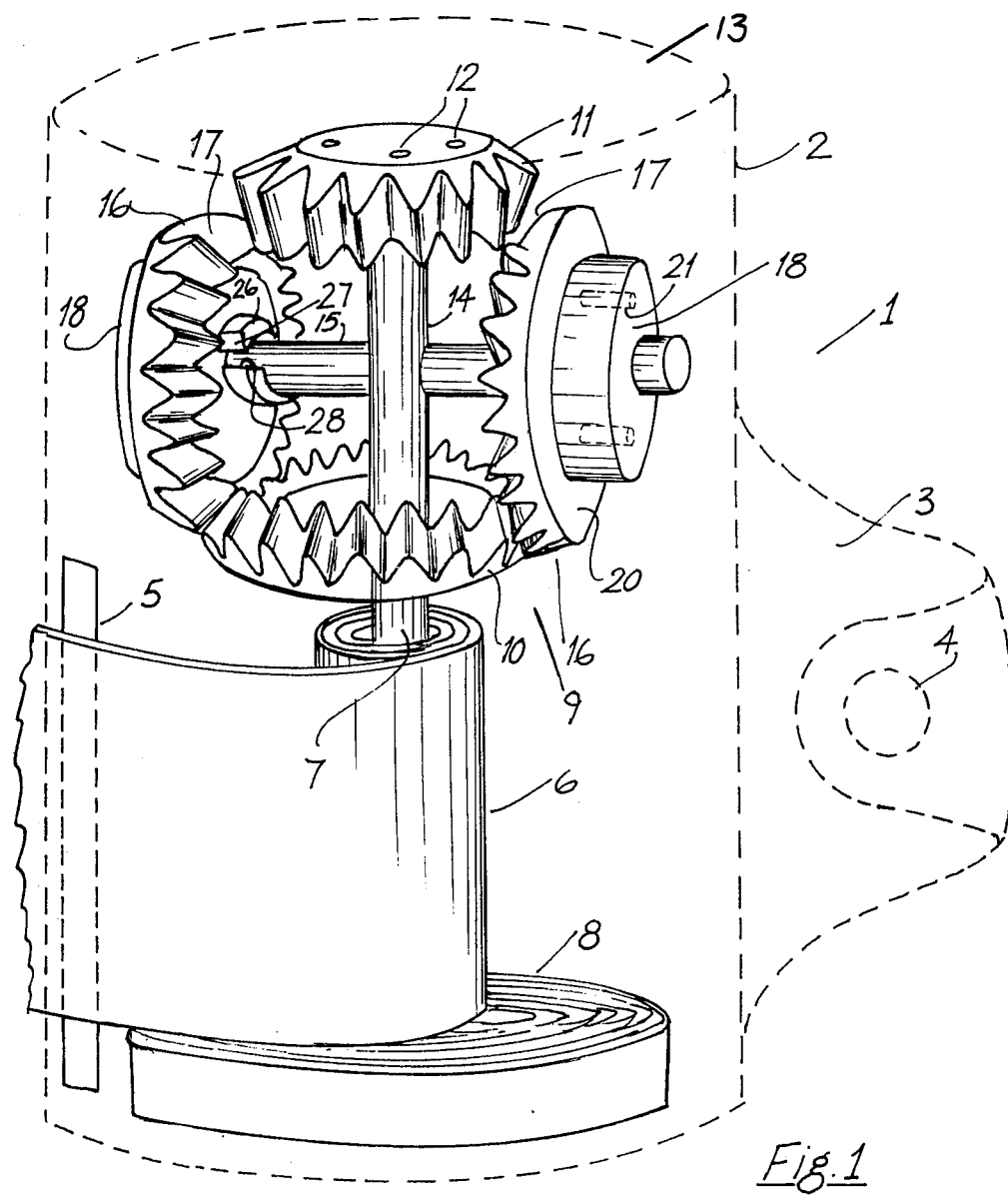
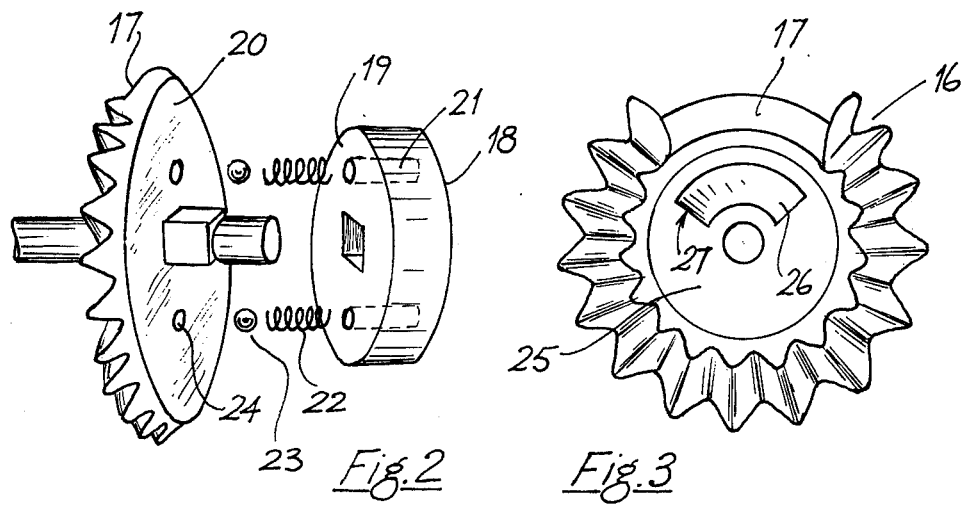
Fig. 1
Fig. 2  Fig. 3

LOCKING DEVICE FOR SAFETY BELT

This invention relates to a locking device for self-coiling vehicle safety belts, that is, a device to lock the belt automatically against further withdrawal from the reel or coil in the event of sudden displacement of the person wearing the belt relative to the vehicle, while permitting free withdrawal when the displacement is gradual. Many such devices are known in the art and are generally designated inertia reels or inertia locks, although not all of them make effective use of inertia.

A typical inertia reel or lock comprises, journalled in a housing, a shaft on which the webbing of a safety belt can be wound, a return spring arranged between housing and shaft to wind up the belt, and the actual locking mechanism. The return spring is commonly a spiral spring of clock main-spring type, fixed at its outer end to the housing and at its inner end to the shaft, biasing the shaft in the direction of gathering up the belt.

The locking mechanism may be designed to act in response to the exceeding of a pre-set threshold value by any of several possible parameters. Thus it may act when the acceleration of the belt wearer, or the rate of withdrawal of the belt from the coil, or the tension on the belt, exceeds a given value, as set out in British patent specification Nos. 1,324,667, 1,237,168 and 1,236,051 respectively. Other methods of operation are given in British patent specification Nos. 1,349,471, involving a pendulum, and 1,119,437 involving a ball which rolls in a saucer. Some of the known locking mechanisms are incapable of operating unless the vehicle containing them is upright. Others are inherently inadequate because they respond to factors other than wearer acceleration, which is the essential factor leading to passenger injury in traffic accidents. Others take the imposed load unsymmetrically in operation, which is undesireable from the standpoint of mechanical strength.

It is an object of the invention to provide an acceleration-sensitive locking device for a safety belt, capable of operating irrespective of the position or attitude of the vehicle in which it is installed. It is another object of the invention to provide a locking device which bears the imposed load in symmetrical fashion in use.

The present invention therefore provides a locking device for a self-coiling vehicle safety belt, which device comprises a. a spindle gear keyed to the coil spindle;
b. a fixed gear on the coil spindle mounting or an extension thereof;
c. at least one planetary gear adapted to mesh with the fixed gear and with the spindle gear;
d. portions of the planetary gear defining a toothless segment thereof, the toothless segment determining a resting rotary attitude of the planetary gear out of engagement with the fixed gear only;
e. means for biasing the planetary gear into the resting rotary attitude against all torques below a predetermined threshold magnitude; and
f. stop means for locking the planetary gear against rotation in excess of a predetermined angle of rotation from the resting rotary attitude thereof, in the direction corresponding to withdrawal of the safety belt.

Thus withdrawal of the coiled safety belt from the reel with an acceleration below a predetermined minimum value produces only orbital motion of the planetary gear, so that it does not rotate about its own axis and does not mesh with the fixed gear, and the same teeth of the planetary gear remain meshed with the spindle gear.

But withdrawal of the belt with or above the said predetermined minimum acceleration causes the spindle gear to apply to torque to the planetary gear exceeding the threshold magnitude mentioned under (e) above. Thus the biasing means (e) are overcome, the planetary gear is propelled out of its resting attitude and rotated into mesh with the fixed gear. Consequent orbital and rotary motion of the planetary gear proceed until, the predetermined rotation angle having been traversed, the stop means (f) locks the planetary gear. This automatically locks the spindle gear, the spindle, and the safety belt so long as many tension effective for normal belt withdrawal persists.

There is preferably provided a symmetrical pair of planetary gears, or three planetary gears, disposed about the spindle gear and meshing therewith. The spindle gear axis may be perpendicular or parallel to the axis of the planetary gears, giving respectively a differential-gear configuration or a planar epicyclic gear train configuration to the device of the invention. In the differential-gear configuration, the fixed gear is a toothed wheel resembling the spindle gear and co-axial therewith. In the planar epicyclic gear train configuration, the fixed gear is an internally toothed ring gear which is bridged by the other gears.

The planetary gears are preferably mounted on a bearing arm or spider on which is located the stop means and the means for biasing said planetary gears into the resting rotary attitude. The biasing means may be a torsion spring attached to a face of each planetary gear and to the bearing arm. Alternatively, and preferably, the biasing means comprise, in the case of each planetary gear, an extension of the bearing arm having a face in sliding contact with face of the gear, at least one recess in one of said faces housing a spring-loaded ball adapted to engage a corresponding depression in the other face. This arrangement ensures that definite threshold force is necessary to dislodge the ball or balls and that said threshold force is greater than that necessary to deflect the ball loading springs alone.

The stop means (f) preferably comprises, in the case of each planetary gear, a pair of surfaces adapted upon mutual abutment to stop the gear rotating, one member of the pair being integral with or fixed to the gear, and the other member of the pair being integral with or fixed to the bearing arm or spider. Each of the surfaces of each pair lies for preference in a plane which contains the corresponding gear axis.

The invention will be understood from the following description of two preferred embodiments thereof given by way of example only with reference to the accompanying drawings in which:

FIG. 1 is a perspective view of a locking device with the housing indicated in broken outline;

FIG. 2 is an exploded perspective view of one of the planetary gears from FIG. 1;

FIG. 3 is a face elevation of the gear of FIG. 2, showing the face not shown in FIG. 2.

Figure 4:
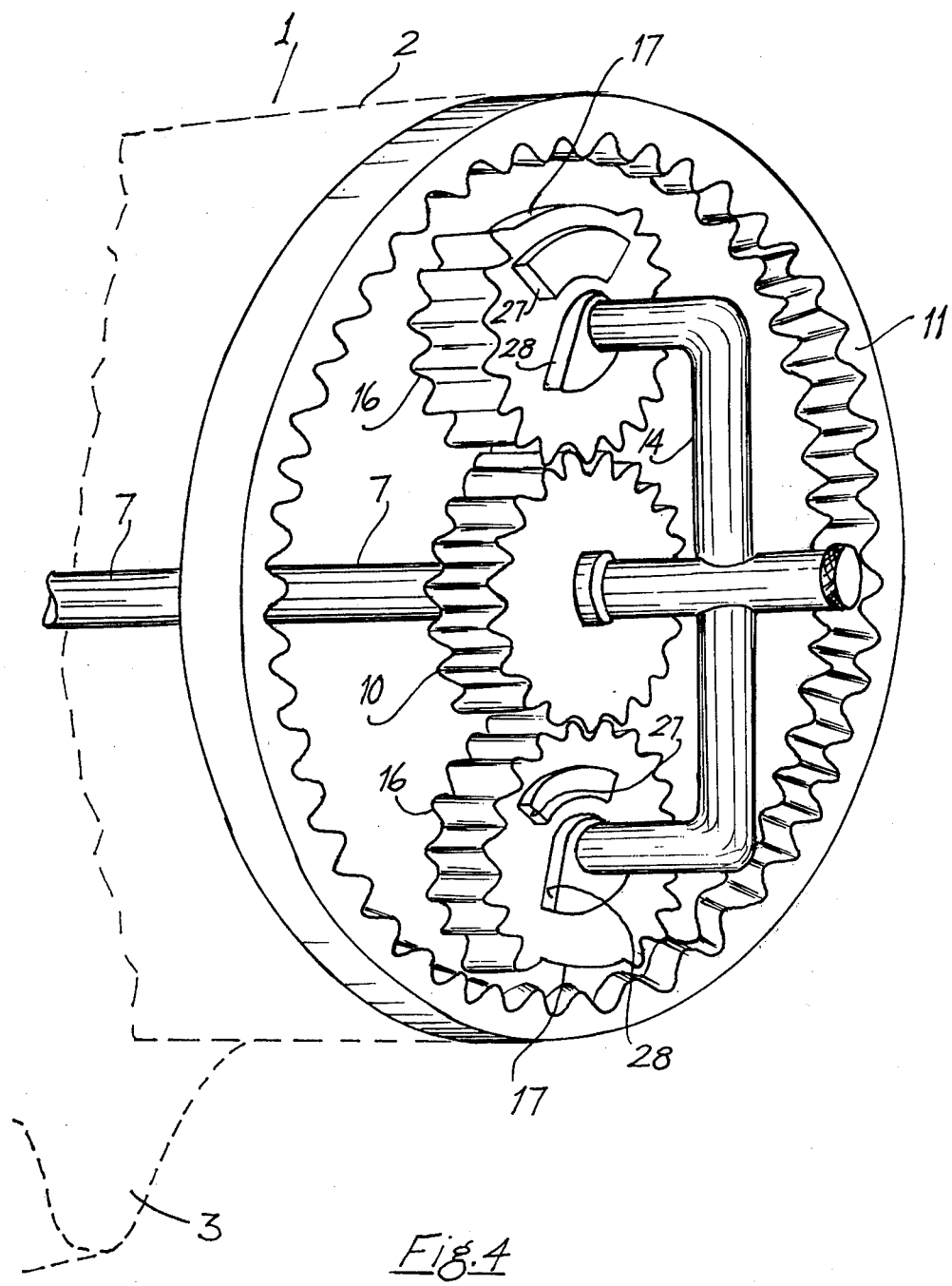
FIG. 4 is a perspective view of a second locking device.

Referring now to the drawings, a locking device 1 comprises a tubular housing 2 having a lug 3 with a hole 4 for mounting the device in a vehicle, a slot 5 for a seat belt 6 wound around a journalled coil spindle 7 which is biased by a spiral spring 8 to retract the belt whenever possible, and a locking mechanism 9.

The locking mechanism 9 comprises a spindle gear 10 keyed to the coil spindle 7, a fixed gear 11 immovably mounted by spot welding 12 to one end 13 of the housing 2, and a spider 14 journalled in or centrally of the gears 10 and 11. The spider 14 is free to rotate in relation to said gears, and has rotatably mounted on the extremities of its transverse arm 15 a pair of planetary gears 16. Each planetary gear 16 meshes at all times with the spindle gears 10 but bears a toothless segment 17 ensuring that the gears 16 must be rotated (about ⅛ inch or 3mmm in practice) before they mesh with the fixed gear 11. Rotation of the planetary gears 16, however, (as distinct from orbital motion thereof) is resisted by an extension 18 of the spider 14, having a face 19 in sliding contact with a face 20 of the planetary gear 16, and containing two spring housings 21 with compression springs 22 each urging a steel ball 23 into a slightly less than hemispherical depression 24 in the face 20 of the planetary gear 16 to lock the same against all torques lower than a predetermined threshold torque.

The opposite face 25 of each planetary gear 16 bears a raised ramp 26 which terminates in a stop face 27. A cooperating stop face 28 is carried by the spider 14 to limit the rotary travel of the planetary gears 16.

In use, normal withdrawal of the belt 6 and retraction thereof by the spring 8 take place with accelerations below the threshold value, and result in the spindle gear 10 imparting orbital motion only to the pair of planetary gears 16 which accordingly orbit free of contact with the fixed gear 11. Belt withdrawal under severe vehicular braking or collision conditions takes place with threshold value acceleration or greater. The resulting torque on the planetary gears 16 overcomes their inertia and also displaces the balls 23 from their depressions 24 causing the planetary gears 16 to rotate into engagement with fixed gear 11. The subsequent motion of the planetary gears 16 is necessarily both rotary and orbital (because gear 11 is fixed) and continuous until the abutment of stop faces 27 and 28 brings all motion of the mechanism to a locked halt. The locking extends, of course, to spindle gear 10, coil spindle 7 and safety belt 6, thus achieving the purpose of the locking device 1.

Referring now specifically to FIG. 4, wherein the numbering of parts corresponds to that used in the above description, it will be seen that this embodiment of the locking device of the invention utilises an epicyclic gear train within a ring gear 11 which is the fixed gear. The fixed ring gear is integral with the housing 2, and the sun or reel gear 10 and the planetary gears 16 are of the spur type instead of being bevel gears as in the other preferred embodiment. The stop means and the biasing means employed in this embodiment are identical to those employed in the other preferred embodiment. The operational principle remains the same for this embodiment and is largely covered by the description of the operation of the preferred embodiment.

The first preferred embodiment described is very compact and its design has an inherent strength by virtue of the way in which the four gears spread the stresses and their resultant strains over the entire device. Also the stops are in pairs which halves the strain on each.

The operating principle of the invention is based on the presence of minimal moments of inertia — that is, no part of the mechanism translates (except the spring 22 and balls 23 in which the translation effect is negligible). Hence the mechanism is unaffected by gravity or by any internal forces of a translational nature which might tend to alter its pre-set threshold of response to belt accelerations. Its immunity to gravity enables it to be fitted or located in any orientation or position whatsoever without impairing its efficiency. Thus it would be ideally suited for use in aeroplanes, for example.

A 3-point location one-piece belt with free running of the belt through a lap and diagonal junction point is preferred for use with this mechanism. No buckle is necessary. Two clip-in type fittings attached to the belt, one of which is free-running on the belt, clip into location points mounted on the vehicle floor or seat. Pillar type location points of the fixed type are preferred.

The amount of free belt play which occurs between attainment of the initial acceleration threshold and the final locking of the mechanism is very slight in the case of a 3 point — location belt of the kind hereinbefore described if the planetary gear rotation range, measured circumferentially, is restricted for example to ½ inch. Provided that the planetary gear/spindle gear ratio is 1:2 and the belt coil/spindle gear ratio is 1:2 (with belt almost completely unreeled), the effective free play of the belt is 1/16 inch.

In use the safety belt is almost fully uncoiled so that the effective coil radius is smaller than that of the spindle gear 10, preferably about half of the latter radius. The consequent mechanical disadvantage means that a very small belt withdrawal (of the orfer of ⅛ inch or 3mm as desired) gives rise to relatively larger circumferential displacements of the planetary gears 16 of the order of ¼ inch or 6mm, if the acceleration at which the withdrawal takes place is above the set threshold. These displacements can be made greater still by appropriate choice of the ratio between the spindle gear 10 and the planetary gears 16. In the case just described, a ratio of 1:2 would increase the displacement to about ½ inch or 12mm.

Preferably the bearings are of the lubricant-impregnated sintered metal type and therefore should require no oiling throughout the life of the mechanism. All other parts of the device are manufactured from good quality steel.

The springs 22 are perhaps the parts most likely to fail, but since any spring failure merely lowers the acceleration threshold at which the mechanism locks, the mechanism is fail-safe in this respect. If only one of the springs fails, the effect is again a lowering of the said threshold (to a value at which one ball 23 is dislodged instead of two) since a free planetary gear 16 cannot rotate without its fellow gear 16 rotating also, the same of course being true of orbital motion of said gears.

It is important that meshing of the planetary gears 16 with the fixed gear 11 takes place when the safety belt is withdrawn with sufficient acceleration, and that there is no likelihood of said gears crashing, or rebounding out of engagement, a defect sometimes encountered in the prior art. This is effected for preference, according to the invention, by one or both of the following two features:

i. The gap between the leading tooth of a resting planetary gear 16 (at the margin of the toothless segment) and nearest tooth of the fixed gear 11 is intentionally kept very small (e.g. ⅛ inch or 3mm). Thus no appreciable gear rotary momentum can ever build up before locking occurs;

ii. Misalignment on contact, between gears 16 and 11, is self-correcting, since any misalignment tending to resist rotary motion of a gear 16 will automatically tend to cause orbital motion thereof and vice versa.

I claim:

1. A locking device for a self-coiling vehicle safety belt, of the type having a mounted coil spindle attachable to the vehicle, which device comprises
   a. a spindle gear keyed to the coil spindle;
   b. a fixed gear on the coil spindle mounting or an extension thereof;
   c. at least one planetary gear adapted to mesh with the fixed gear and with the spindle gear;
   d. portions of the planetary gear defining a toothless segment thereof, the toothless segment determining a resting rotary attitude of the planetary gear out of engagement with the fixed gear only;
   e. means for biasing the planetary gear into the resting rotary attitude against all torques below a predetermined threshold magnitude; and
   f. stop means for locking the planetary gear against rotation in excess of a predetermined angle of rotation from the resting rotary attitude thereof, in the direction corresponding to withdrawal of the safety belt.

2. A locking device as claimed in claim 1, wherein (c) a balanced set comprising at least two planetary gears is provided.

3. A locking device as claimed in claim 2 wherein the spindle gear axis is perpendicular to the axes of the planetary gears, and the fixed gear is a simple toothed wheel whereby the locking device has a differential-gear configuration.

4. A locking device as claimed in claim 2 wherein the spindle gear axis is parallel to the axes of the planetary gears, and the fixed gear is an internally toothed ring gear, whereby the locking device has a planar epicyclic gear-train configuration.

5. A locking device as claimed in claim 1 wherein (e) the means for biasing the planetary gear into the resting rotary attitude comprises an extension of the planetary gear spindle or mounting having a face in sliding contact with a face of the gear, at least one recess in one of said faces housing a spring-loaded ball, and at least one corresponding depression in the other face being adapted to engage the ball.

6. A locking device as claimed in claim 1 wherein (f) the stop means comprises a pair of surfaces adapted upon mutual abutment to stop the planetary gear rotating, one member of the pair being integral with or fixed to the planetary gear, the other member being integral with or fixed to the planetary gear spindle or mounting or an extension thereof.

7. A locking device as claimed in claim 6 wherein each of the pair of surfaces lies in a plane which contains the planetary gear axis.

* * * * *